United States Patent Office 3,681,167
Patented Aug. 1, 1972

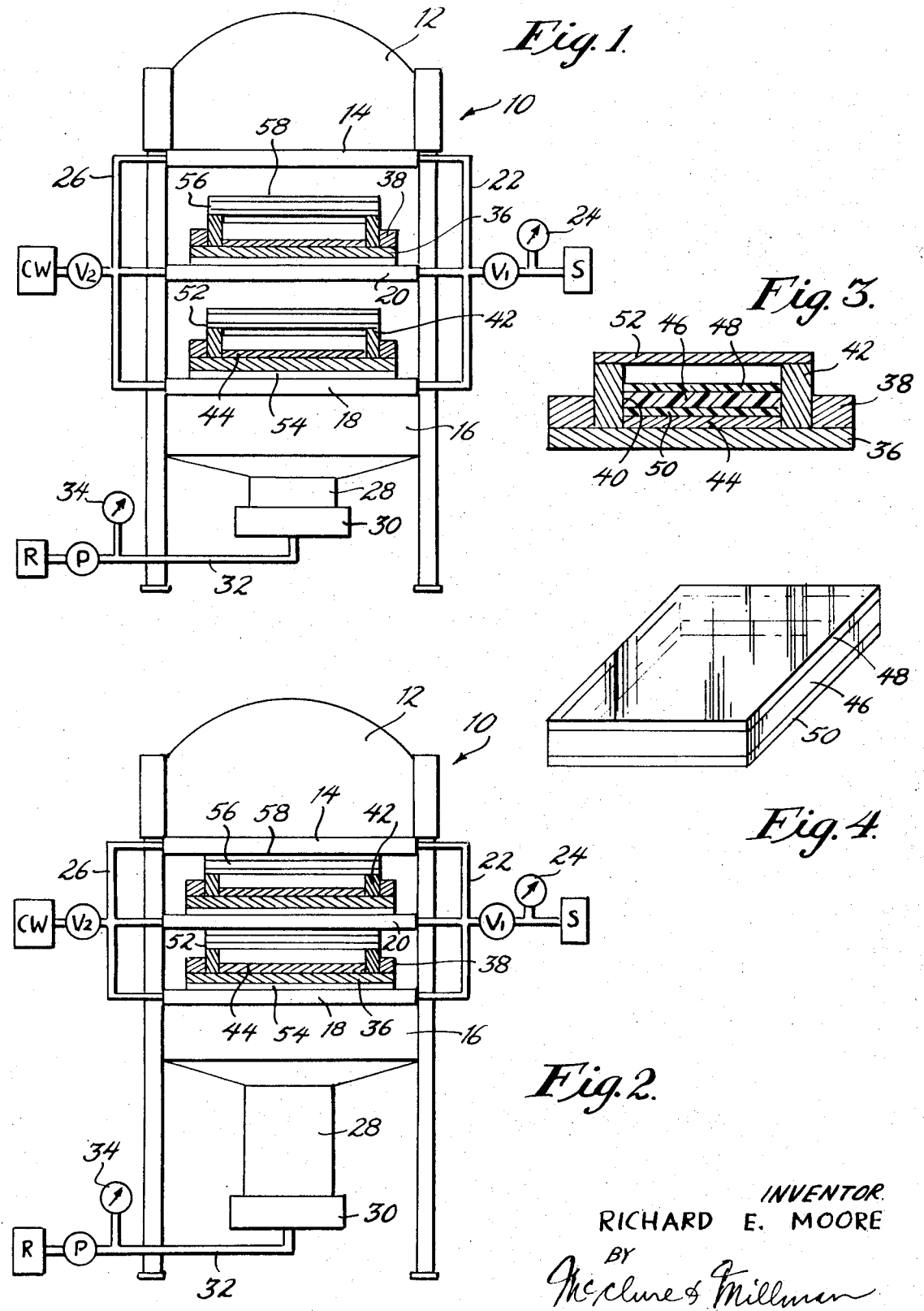

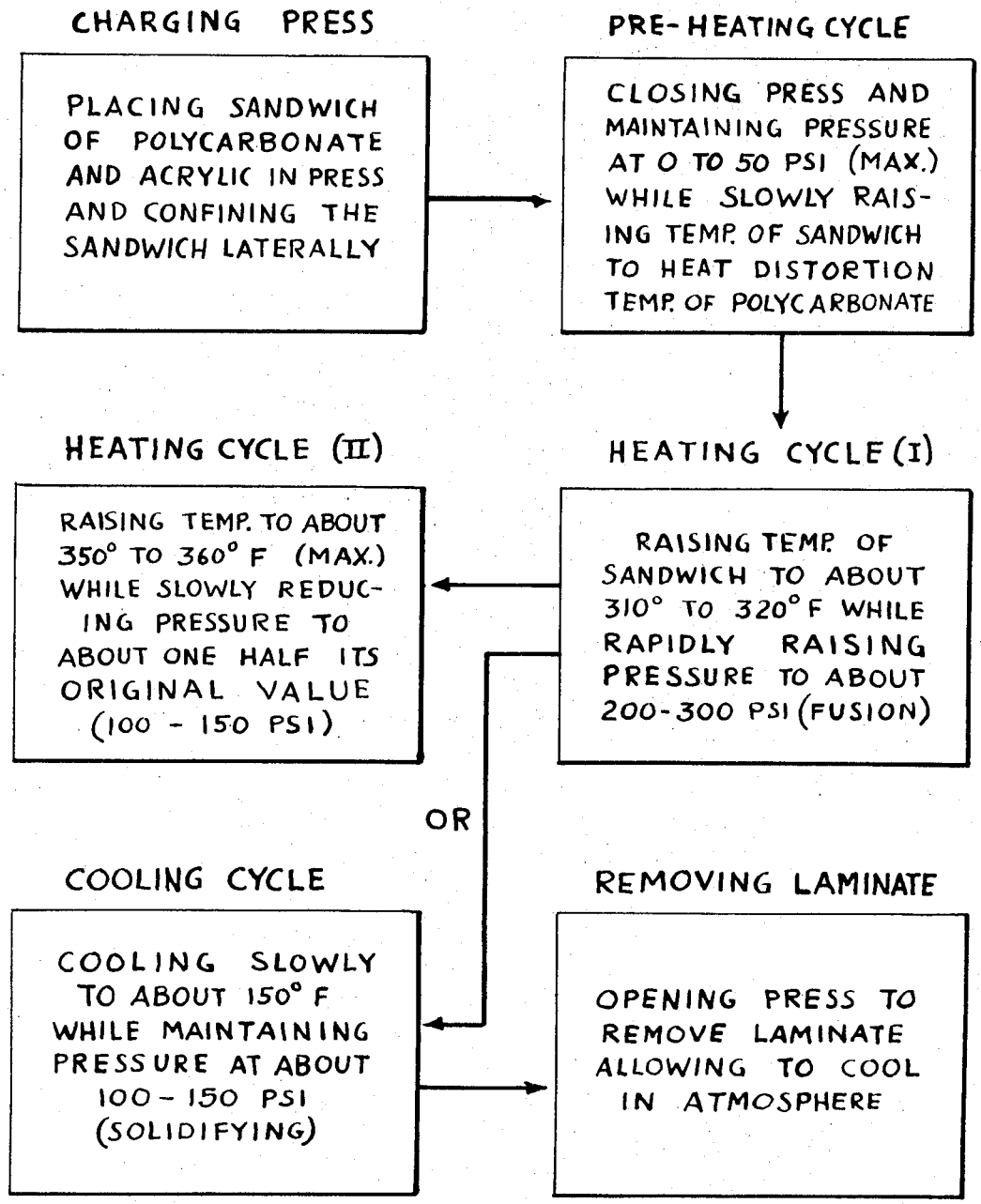

3,681,167
METHOD OF MAKING ACRYLIC-POLYCARBONATE LAMINATE
Richard E. Moore, R.D. 1, Locust Grove Road,
West Chester, Pa. 19380
Filed July 13, 1970, Ser. No. 54,186
Int. Cl. C09j 5/06
U.S. Cl. 156—311                    6 Claims

ABSTRACT OF THE DISCLOSURE

A method of forming a laminate of cast monomeric acrylic resin sheets having a core of extruded polycarbonate resin sheet comprises confining the sheets laterally, maintaining the external faces in contact with mirror polished plates, preheating the sandwich to the distortion temperature of the polycarbonate while applying a low pressure to expel entrapped air, increasing the pressure to about 200–300 p.s.i., maintaining the temperature at the fusion temperature of the plastic sheets to bond them, and cooling to about 150° F. while maintaining the pressure at about 100–150 p.s.i., thereby providing a laminate with good optical properties.

---

This invention relates to acrylic clad polycarbonate sheets and a method of laminating the same by fusion bonding.

Polycarbonate resins are polyesters of carbonic acid and bisphenol A, are transparent, are thermoplastic and are well known for their high mechanical strength properties such as toughness, high impact strength and high tensile strength over a broad temperature. They are extruded as sheets and as such contain ripples, wiggles, extrusion die lines or stresses and even blemishes. However, polycarbonate resins are difficult to grind, buff and polish by conventional means to remove these ripples, die lines and blemishes to thus produce desirable optical properties of high luminous transmittance, low haze and low distortion.

Acrylic resins cast as sheets from the monomer, (thermoplastic resins known in the art as cast acrylics) on the other hand, have less mechanical strength than the polycarbonates, have excellent properties of weather resistance, dimensional stability and can be ground, buffed and polished by conventional means to remove scratches, nicks and the like and possess generally good optical properties. Hence, it is desirable to combine the cast acrylic sheets with the extruded polycarbonate sheets to secure a transparent plastic member having very good mechanical properties as well as good heat and chemical resistance and good optical properties, so that the member can be formed into such articles as airplane windshields and canopies, protective headgear, and see-through enclosures requiring minimal wall thicknesses.

The primary object of the invention is to provide an acrylic-polycarbonate laminate in which the polycarbonate layer is substantially free of ripples and extrusion die lines or stresses and thus has good optical strength and heat and chemical resistance properties.

Another object of the invention is to provide an efficient method of laminating acrylic to polycarbonate by fusion bonding without thinning the plastic layers during the process while eliminating substantially all of the ripples and extrusion die lines or stresses of the extruded polycarbonate sheets.

Another object of the invention is to provide an efficient method of laminating acrylic to polycarbonate by fusion bonding without thinning the plastic layers during the process while eliminating substantially all of the ripples and extrusion die lines or stresses of the extruded polycarbonate sheets and in which the lamination is carried out between mirror finish plates so as to form a laminate during the lamination having good optical properties of high luminous transmittance and low percentage haze.

Another object of the invention is to provide a method of laminating acrylic sheets to polycarbonate sheets employing a sequence of first preheating the superimposed laterally confined layers relatively slowly to the heat distortion temperature of the polycarbonate in a closed press between highly polished members while little or no pressure is applied to soften the sheets without rendering them tacky so as to expel air between the sheets to provide good face to face contact; then increasing the temperature to the fusion temperature of the polycarbonate and acrylic while rapidly increasing the pressure to a predetermined relatively high value to thus cause the layers to bond by fusion while eliminating ripples, extrusion die lines and stresses from the polycarbonate; then slowly reducing the pressure to about half its value while raising the temperature still further to a predetermined high value to eliminate molecular memory and suppress thinning, if the laminate is to be heat formed into a final article; and finally cooling the laminate while maintaining the pressure at the reduced value before it is removed from the press for ultimate cooling in air.

These and other objects of the invention will become more apparent as the following description proceeds in conjunction with the accompanying drawings, wherein:

FIG. 1 is a diagrammatic view of a multi-platen press shown open and charged with the members required to initiate lamination of the polycarbonate to the acrylic sheets;

FIG. 2 is a view similar to FIG. 1 showing the press closed;

FIG. 3 is a sectional view through the mold retaining the layers of polycarbonate and acrylic and the mirror finish plates employed in the lamination process;

FIG. 4 is a perspective view of the final acrylic clad polycarbonate sheet; and

FIG. 5 is a flow diagram of the sequential process steps.

Specific reference is now made to the drawings in which similar reference characters are used for corresponding elements throughout.

Polycarbonate resins, which are polyesters of carbonic acid and bisphenol A, are commercially available in various grades under such trademarks as Lexan (General Electric), Merlon (Mobay Chemical), etc. They have high tensile and impact strength, are shatter-proof and are extrudable as transparent sheets. Since the as extruded sheets contain ripples, wiggles, extrusion die lines, stresses and even blemishes, they do not possess desirable optical properties and cannot be readily ground, buffed and polished by conventional means to remove these imperfections.

On the other hand, the acrylics, which are cast from the monomer, such as Plexiglas G, II and IA made by Rohm & Haas Co., are capable of being ground, buffed and polished by conventional means and have other desirable properties, such as high light transmittance, excellent weather resistance, dimensional stability, and good resistance to chemical attack. Hence, acrylic clad polycarbonate would combine the aforementioned desirable properties of the acrylics with the superior mechanical strength properties of the polycarbonates if a laminate could be made without air gaps and substantially free of ripples, wiggles, extrusion die lines and stresses in the polycarbonate; and the instant invention provides such an article and an efficient and accurate method of making the same.

The steam heated press 10 employed to carry out the process is conventional and generally comprises a head 12 having an upper platen 14 at its lower surface, a vertically movable bed 16 carrying a lower platen 18 and a plurality of vertically movable platens 20 (only one shown as illustrative) between the upper and lower platens defining between them the laminating positions. The platens include interior coils which are connected by suitable couplings and flexible hoses 22 to a source S of steam under pressure via a valve $V_1$, there being a pressure gauge 24 in the line. The platens are also connected by suitable couplings and flexible hoses 26 to a source of cold water CW via an appropriate valve $V_2$.

The press is hydraulically operated from below by means of a ram 28 secured to the bed 16 and vertically movable in a cylinder 30. Appropriate conduits 32 connect the cylinder to a source of hydraulic fluid R via a pump P and a pressure gauge 34. The means to raise and lower the ram and thus close and open the press are well known and can involve a reversible pump P or a pair of pumps and separate hydraulic circuitry, or equivalent means.

When the ram is retracted, the press is open as shown in FIG. 1 and the sheets of superimposed layers of acrylic and polycarbonate are charged therein. As shown in FIG. 3, a metal mold, preferably made of aluminum, is provided consisting of a base plate 36 with a frame 38 secured theron forming a substantially rectangular mold cavity 40 therein. A wooden frame 42 made of a compressible wood, such as pine, is placed in the cavity against the inner surface of the metal frame 38 thereby narrowing the mold cavity 40.

A highly mirror polished plate 44 is placed on the upper surface of the mold plate 36 within the confines of the wooden frame 42. The plate 44 is preferably a hard rolled brass press plate having a pressure resistance of about 64,000 p.s.i., offering excellent resistance to deformation, made from a double spring hard special copper alloy with a clean alpha structure, i.e. only one kind of crystal, and is therefore capable of taking a mirror-like polish (National Electrical Association of the U.S.A. designation No. 8) without any visible polishing lines. To protect the mirror polished surface, the plate may be nickel plated with a layer of about .00032" or plated on the nickel with a layer of about .00008" chromium. Such a plate is commercially available as Wieland highly mirror polished press plates sold by Fabrite Metals Corporation of New York, N.Y. In place of the mirror polished brass plate, a heat or chemically tempered glass with highly polished parallel surfaces can be used, provided the same can withstand the pressures and temperatures employed in the lamination and any torque to which the plate may be subjected due to uneven closure of the platens. The plastic sandwich which is substantially coextensive with the mirror finish plate 44 is placed thereover, the overall thickness of the sandwich being less than the height of the wooden frame 42.

As seen in FIG. 3, the sandwich comprises super-imposed layers of acrylic and polycarbonate sheets. Although the invention can be carried out with two layers, one acrylic and the other polycarbonate, a plurality of layers can be used, three layers being preferred with the thicker polycarbonate layer 46 being the core and the acrylic layers 48 and 50 being the outer members. The acrylic sheets cast from the monomer are usually of thin gauge, i.e. about .060" to ¼", whereas the central layer of polycarbonate is extruded in a maximum thickness of ⅜". If one wished to make a laminate in which the polycarbonate layer were ½" to ¾" thick, two or more layers of polycarbonate would be superimposed on each other between the outer layers of acrylic. As extruded, the polycarbonate sheet contains ripples, wiggles, extrusion die lines, stresses and possibly other imperfections which must be substantially removed during lamination to provide material which has good optical properties, which the instant invention accomplishes.

A second highly mirror polished plate 52 complementary to plate 44 is placed on the upper edge of the wooden frame 42 and hence is spaced above the upper surface of the acrylic layer 48. A thin resilient member 54, preferably cardboard, is interposed between the lower surface of the mold plate 36 and the platen upon which the plastic sandwich and mold are mounted. A further metallic backer plate 56, preferably aluminum, is placed on the mirror finish plate 52 and finally another resilient member 58, preferably cardboard, is placed over the aluminum plate 56. The cardboard sheet is used as a good insulator to even out the heating or cooling. It also helps level out high and low spots and thus prevent surface blisters. The aluminum backer plate as well as the aluminum mold protect the mirror polished plates, distribute the heat evenly and reduce imperfections affecting the flatness of the platens.

As will be seen in FIG. 1, when the press is open the upper cardboard 58 is spaced from the lower face of the adjacent upper platen in each lamination position. After the open press is charged with a multiplicity of acrylic-polycarbonate sandwiches as the unit of FIG. 3, the press is closed by activation of the pump P so that the ram 28 raises the bed 16 and each upper cardboard 58 engages the lower surface of each upper adjacent platen. Steam is then admitted to the platens 20 via the valve $V_1$. During the closing of the press the upper platen compresses the wooden frame 42 of the unit resting upon the adjacent lower platen to the point where the upper mirror polished plate 52 contacts the upper face of the upper acrylic layer 48 as seen in FIG. 2. The pressure upon the sandwich is maintained in the range of zero, i.e. the weight of the platens, up to 50 p.s.i. as a maximum and such low pressure is maintained while the temperature is raised slowly to the heat distortion temperature of the polycarbonate so that the plastic sheets soften but do not become tacky. In this pre-heating stage or cycle the entrapped air is expelled between the acrylic layers and the polycarbonate and between the acrylic layers and the mirror polished plates, while lateral flow of the plastic layers is restricted by the frame 42 thus causing even face to face contact of the mating surfaces. In this pre-heating stage, the heat distortion temperature of the polycarbonate is reached at about 270° F. and is attained over a period of about 30 minutes for a ½" to ¾" plastic sandwich, an additional 15–25 minutes being required for another ¼" plastic material. Heat distortion temperature of a plastic is that temperature at which a plastic begins to distort under a pressure of 66 p.s.i.

It should be noted that the mirror finish plate 52 is placed over the frame 42 and not directly on the acrylic layer 48 for the reason that if the wooden frame 42 should form splinters during the compression thereof, the splinters will embed in the edges of the plastic which can be trimmed. On the other hand, if the plate 52 were placed directly against the acrylic, the splinters would lodge between the plate 52 and the aluminum plate 56 which would dent the mirror polished plate 52 and thereby mar the mirror surface thereof.

In the next or heating stage, the pressure is raised to about 200–300 p.s.i. which brings the mating surfaces of the plastic layers in even face to face contact while the temperature is caused to increase to the fusion temperature range of about 310–320° F., at which time fusion bonding of the layers take place. In this stage of the heating cycle, the temperature rises to about 310–320° F. over a period of 10 to 20 minutes while the pressure is maintained constant at about 200–300 p.s.i., at which stage the ripples, wiggles, extrusion die lines and stresses of the polycarbonate layer are substantially eliminated.

Following this heating stage, alternate steps may be employed depending upon the fabrication use to which the laminate will ultimately be put. Thus, if the laminate is to be thermo-formed into the final shaped article, generally at a temperature of 315–330° F., the process of the invention includes a second heating stage wherein the temperature of the sandwich is raised to about 350–360° F. while the pressure is slowly reduced to about half its previous value or 100–150 p.s.i., generally over a period of about 40 to 50 minutes. This second heating stage eliminates molecular memory of the polycarbonate while at the same time thinning of the plastic sandwich is avoided due to the substantial decrease in pressure. It should be noted that in this alternate heating stage the acrylic "floats" on the polycarbonate which becomes sufficiently molten to acquire the smoothness which was already imparted to the acrylic by the mirror finish plates.

Thereafter, the laminate is cooled slowly for about 45 minutes to about 150° F. while still maintaining the pressure at about 100–150 p.s.i. to cause the material to contract and solidify slowly and evenly. The cooling stage is effected by shutting valve $V_1$ and opening valve $V_2$ to the cold water supply CW while maintaining the hydraulic ram pressure at the predetermined value of 100–150 p.s.i.

Finally, the press is opened and the laminate 60 is removed and allowed to cool in the atmosphere.

If the laminate sheet is to be formed mechanically without heat into a final shaped article, then the second or alternate heating stage or cycle can be eliminated, and the cooling cycle set in operation wherein the pressure is reduced from 200–300 p.s.i. to about half its value while the temperature is dropped slowly over a period of about 45 minutes to about 150° F. before the press is opened.

It should be noted that the instant process can be employed to produce an acrylic-polycarbonate laminate without the superior optical properties in which case the mirror polished plates 44 and 52 would not be employed. Of course, an acrylic-polycarbonate laminate with good optical properties is preferred so that the laminate can be advantageously used to fabricate such articles as airplane windshields, canopies, protective headgear and enclosures requiring minimal wall thickness as well as good see-through properties. The laminate of the instant invention does contain good optical properties because the polycarbonate layer is substantially free of ripples, wiggles, extrusion die lines and stresses, has outer surfaces which have been rendered substantially parallel during lamination, has a luminous transmittance greater than the as extruded polycarbonate sheets, a percent haze less than that of the as extruded sheets and low distortion. The laminate in which the core layer is polycarbonate and the outer layers are acrylic is preferred to the laminate in which one of the outer layers is polycarbonate because scratches, blemishes and nicks subsequently formed in use in the polycarbonate cannot be removed by conventional grinding, buffing and polishing means as is possible with the acrylic layers, and the acrylic layers serve as heat buffers.

While preferred embodiments of the invention have here been shown and described, it will be understood that minor variations may be made without departing from the spirit of the invention.

What is claimed is:

1. A method of laminating cast monomeric acrylic resin sheets to extruded polycarbonate resin sheets by fusion bonding comprising forming a sandwich of the sheets so that the acrylic sheets are on the outside and the polycarbonate is the core layer, confining the sandwich laterally, maintaining the opposite external faces of the sandwich between mirror polished plates, pre-heating the sandwich to the heat distortion temperature of the polycarbonate wherein the sheets soften but do not become tacky while applying a low pressure of 0–50 p.s.i. to the opposite faces of the sandwich to expel entrapped air between the layers and between the acrylic sheets and the mirror polished plates, increasing the pressure to about 200–300 p.s.i. and maintaining the temperature at the fusion temperature of the plastic sheets at said elevated pressure to cause the layers to bond evenly while substantially eliminating the ripples, wiggles, extrusion die lines and stresses from the polycarbonate, and cooling the laminate to about 150° F. while maintaining the pressure at about 100–150 p.s.i. to cause even contraction and solidification of the laminate.

2. The method of claim 1 wherein said mirror polished plates are made of spring hard brass having a clean alpha crystal structure polished so that no polishing lines are visible.

3. The method of claim 1 and the step of maintaining the temperature of the laminate at about 350–360° F. and the pressure at about 100–150 p.s.i. prior to cooling to eliminate molecular memory of the polycarbonate while restraining thinning so that the laminate can be ultimately heat formed.

4. The method of claim 1 wherein the pre-heating stage is carried out so that the temperature is raised slowly to the heat distortion temperature of about 270° F.

5. The method of claim 4 wherein the fusion temperature is about 310–320° F. and the pressure is rapidly raised to about 200–300 p.s.i.

6. The method of claim 5 and the step of maintaining the temperature of the laminate at about 350–360° F. and the pressure at about 100–150 p.s.i. prior to cooling to eliminate molecular memory of the polycarbonate while restraining thinning so that the laminate can be ultimately heat formed.

References Cited
UNITED STATES PATENTS

| | | | |
|---|---|---|---|
| 3,388,034 | 6/1968 | McCombie | 161—183 |
| 3,420,679 | 1/1969 | Gifford et al. | 161—183 X |
| 3,520,768 | 7/1970 | Peilstocker et al. | 161—225 |

REUBEN EPSTEIN, Primary Examiner

U.S. Cl. X.R.

156—104; 161—183; 156—99, 312